United States Patent
Gu

(10) Patent No.: US 11,352,083 B1
(45) Date of Patent: Jun. 7, 2022

(54) BICYCLE RACK

(71) Applicant: Haidong Gu, Pomona, CA (US)

(72) Inventor: Haidong Gu, Pomona, CA (US)

(73) Assignee: CYCLINGDEAL USA, INC., Pomona, CA (US)

( * ) Notice: Subject to any disclaimer, the term of this patent is extended or adjusted under 35 U.S.C. 154(b) by 0 days.

(21) Appl. No.: 17/367,421

(22) Filed: Jul. 5, 2021

(51) Int. Cl.
*B62H 3/08* (2006.01)
*B62H 3/04* (2006.01)

(52) U.S. Cl.
CPC .............. *B62H 3/08* (2013.01); *B62H 3/04* (2013.01); *B62H 2700/00* (2013.01)

(58) Field of Classification Search
CPC ... B62H 3/04; B62H 3/06; B62H 3/08; B62H 2700/00; B60R 5/04; B60R 9/10; B60R 2011/0036
See application file for complete search history.

(56) References Cited

U.S. PATENT DOCUMENTS

| | | | | |
|---|---|---|---|---|
| 585,739 | A * | 7/1897 | Temple | B62H 3/08 211/20 |
| 590,443 | A * | 9/1897 | Brundage | B62H 3/04 211/21 |
| 620,863 | A * | 3/1899 | Wilcox | B62H 3/04 211/21 |
| D295,030 | S * | 4/1988 | Wahl | D12/115 |
| 5,377,849 | A * | 1/1995 | Martin | A47F 8/02 211/85.7 |
| 6,053,337 | A * | 4/2000 | Venegas, Jr. | B62H 3/04 211/20 |
| 6,679,408 | B1 * | 1/2004 | Thomas | B60P 3/075 224/403 |
| 7,014,398 | B1 * | 3/2006 | Hellwig | B60P 3/075 410/19 |
| D623,991 | S * | 9/2010 | Nusbaum | D12/115 |
| 2009/0302077 | A1 * | 12/2009 | Yee | B60R 9/00 224/405 |

FOREIGN PATENT DOCUMENTS

JP 2021041876 A * 3/2021
KR 101523713 B1 * 5/2015

* cited by examiner

*Primary Examiner* — Ko H Chan

(57) ABSTRACT

A bicycle rack includes a frame body, compartment bars, hose sleeves and a hanging shelf. The frame body includes two side frames, an upper frame bar and a lower frame bar which are connected between the two side frames. The compartment bars are movably disposed between the upper frame bar and the lower frame bar, and arranged in interval. The hose sleeves are movably mounted on the compartment bars, respectively. The hanging shelf is disposed on one of the two side frames. Each compartment bar can be movably disassembled to adjust an interval between the adjacent two compartment bars; each compartment bar is mounted with a hose sleeve, and even if a wheel width of a bicycle is slightly lower than the interval between the adjacent two compartment bars, the bicycle can be prevented from shaking when being tightened by the hose sleeves.

9 Claims, 7 Drawing Sheets

BICYCLE RACK

BACKGROUND OF THE INVENTION

1. Field of the Invention

The present invention is related to a bicycle rack which is used to park a bicycle and make the bicycle stable, so as to prevent the parked bicycle from being falling over due to a slight external force.

2. Description of the Related Art

A transportation tool can greatly shorten the traveling time when being used correctly, there have been many types of transportation tools with development of science technologies, and the most common tools are vehicles such as automobiles, motorcycles, and bicycles and so on. Among the vehicles, the efficiency of the bicycle is far inferior to engine-driven automobile and motorcycle in shortening the distance, but the bicycle has advantages of convenient parking, easy portability, and use as sports equipment, so the bicycles are still frequently used in an environment with such advanced technology.

Although the bicycle is convenient to park, a bicycle body is too light and thin, so the parked bicycle is easy to fall over due to a small external force. Therefore, most people park bicycles by parking stands or in environment with bicycle rack. However, the existing common bicycle rack has many inconvenience problems; first of all, the more common parking rack uses multiple vertical rods arranged in interval, and a front wheel of the bicycle can be parked between adjacent two vertical rods, to achieve the effect of stabilizing the bicycle body. However, the interval between two vertical rods of the existing parking rack is fixed and cannot be adapted to different model of bicycle. Furthermore, when multiple bicycles are parked in the existing bicycle rack side by side, there is almost no gap between adjacent bicycles, and it is difficult for a rider to hang riding accessory (such as a safety helmet), so the rider has to carry riding accessory. Therefore, the existing bicycle rack is inconvenient for the rider in use.

SUMMARY OF THE INVENTION

An objective of the present invention is to provide a bicycle rack including compartment bars which can be movably disassembled to adjust an interval between the adjacent two compartment bars; furthermore, each compartment bar is mounted with a hose sleeve, and even if a wheel width of a bicycle is slightly lower than the interval between the adjacent two compartment bars, the bicycle can be prevented from shaking when being tightened by the hose sleeves; furthermore, the bicycle rack of the present invention includes a hanging shelf for a rider to hang riding accessory, so as to achieve the purpose of solving the conventional problem.

In order to achieve the aforementioned objective and effect, the present invention provides a bicycle rack including a frame body, a plurality of compartment bars, a plurality of hose sleeves and a hanging shelf. The frame body includes two side frames, an upper frame bar and a lower frame bar, and each of the upper frame bar and the lower frame bar is connected between the two side frames. The plurality of compartment bars are movably disposed between the upper frame bar and the lower frame bar, and each adjacent two of the plurality of compartment bars are spaced by an interval. The plurality of hose sleeves are movably mounted on the plurality of compartment bars, respectively. The hanging shelf is disposed on one of the two side frames.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
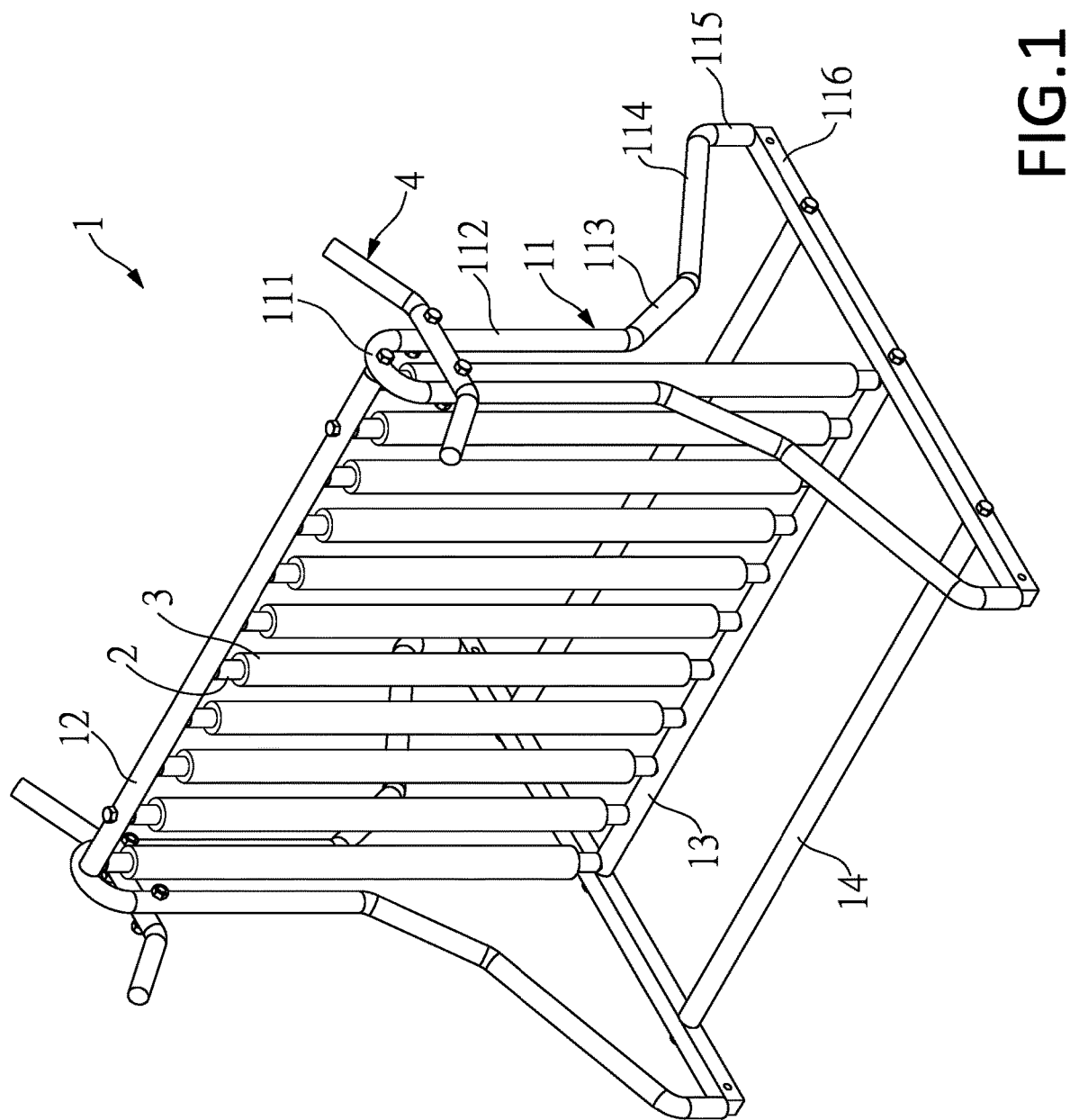
FIG. 1 is a perspective view of a bicycle rack of the present invention.
Figure 2:
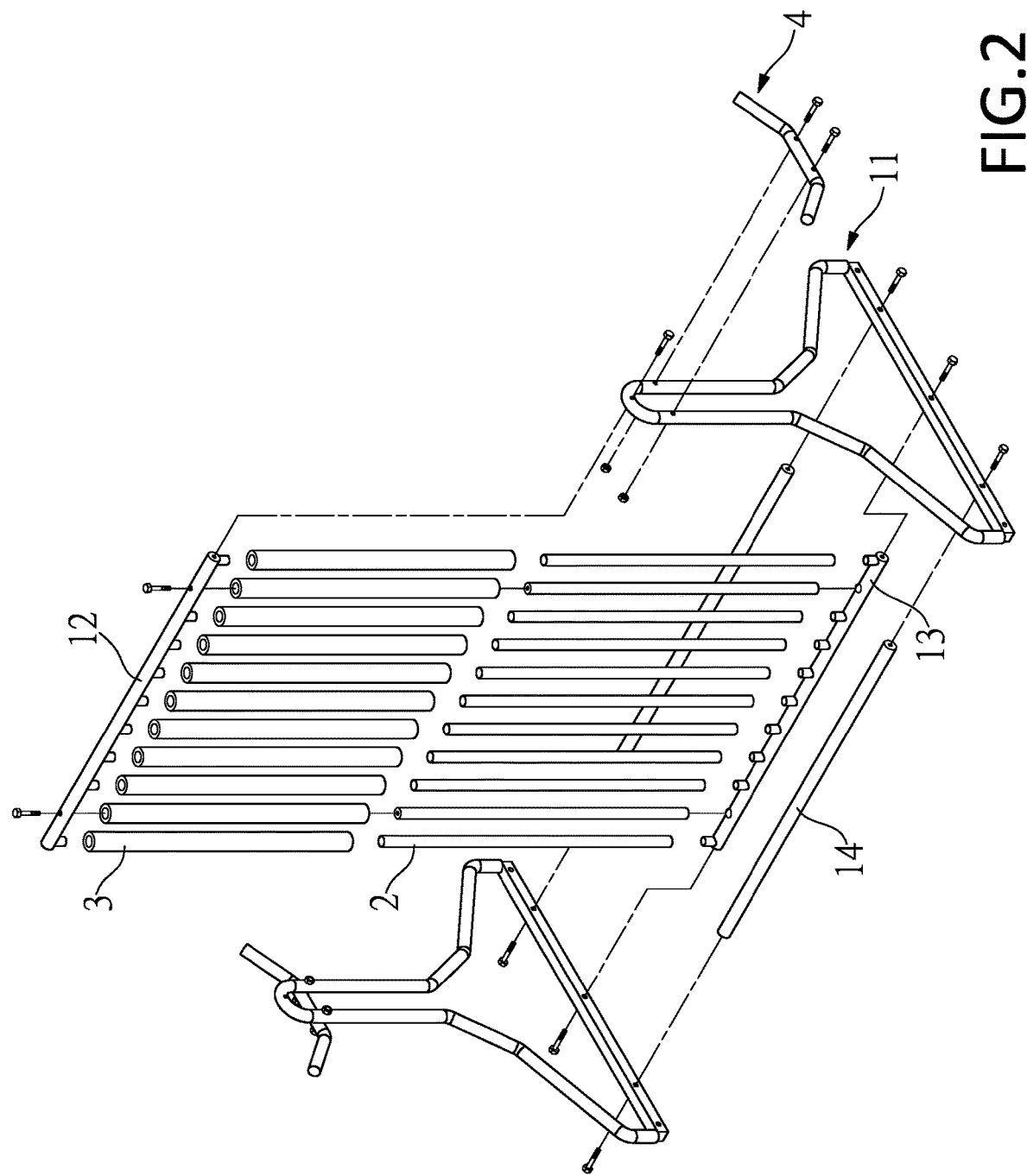
FIG. 2 is an exploded view of a bicycle rack of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

The implementation of the present invention is described in detailed with reference to FIGS. 1 to 5. As shown in FIG. 1, a bicycle rack of the present invention includes a frame body 1, a plurality of compartment bars 2, a plurality of hose sleeves 3 and a hanging shelf 4. The frame body 1 includes two side frames 11, an upper frame bar 12 and a lower frame bar 13, and each of the upper frame bar 12 and the lower frame bar 13 is connected between the two side frames 11. The plurality of compartment bars 2 are movably disposed between the upper frame bar 12 and the lower frame bar 13, and each adjacent two of the plurality of compartment bars 2 are spaced by an interval. The plurality of hose sleeves 3 are movably mounted on the plurality of compartment bars 2, respectively. The hanging shelf 4 is disposed on one of the two side frames 11.

Figure 3:
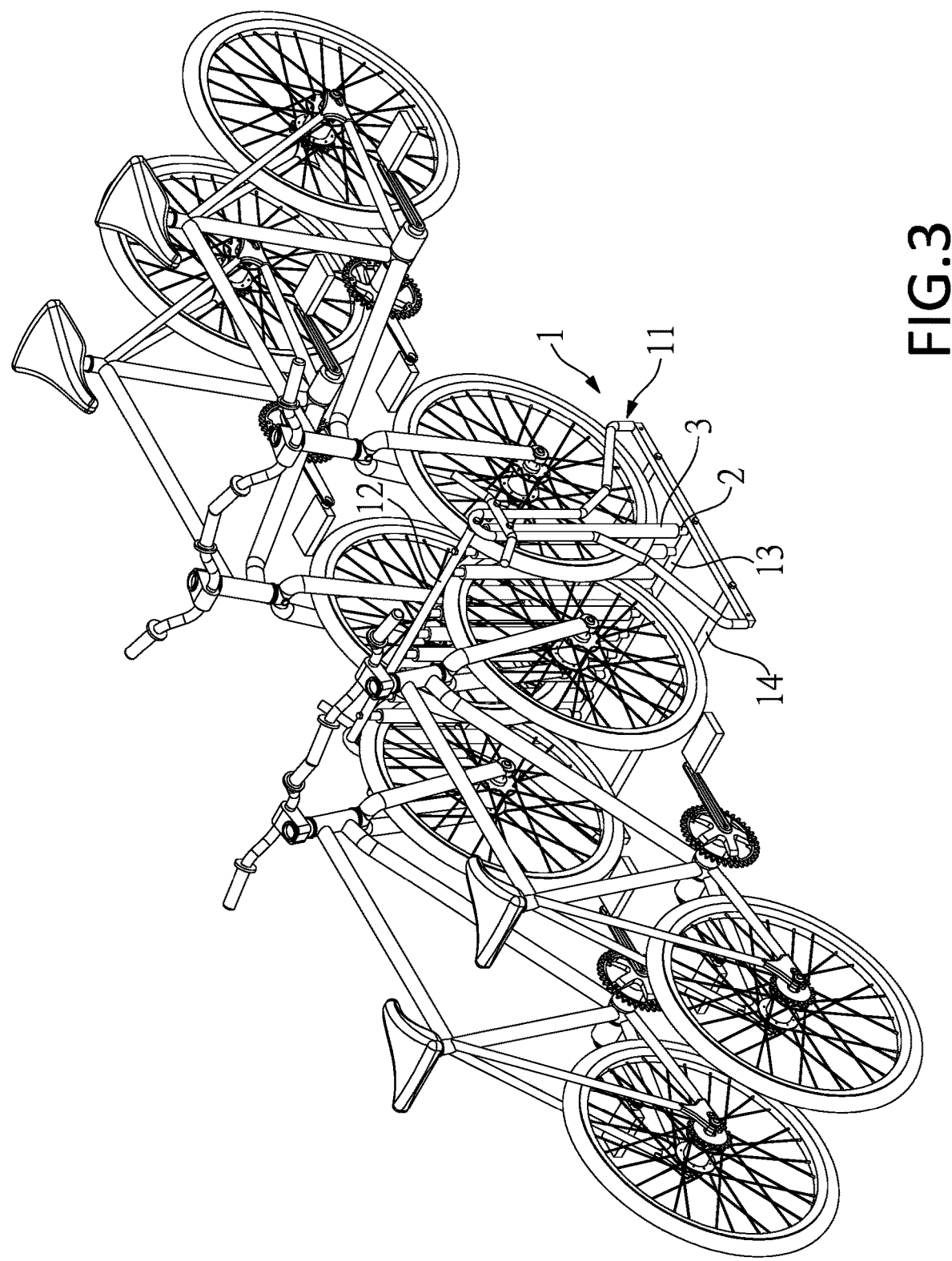
FIG. 3 is a schematic view of a bicycle rack in use, according to the present invention.
Figure 4:
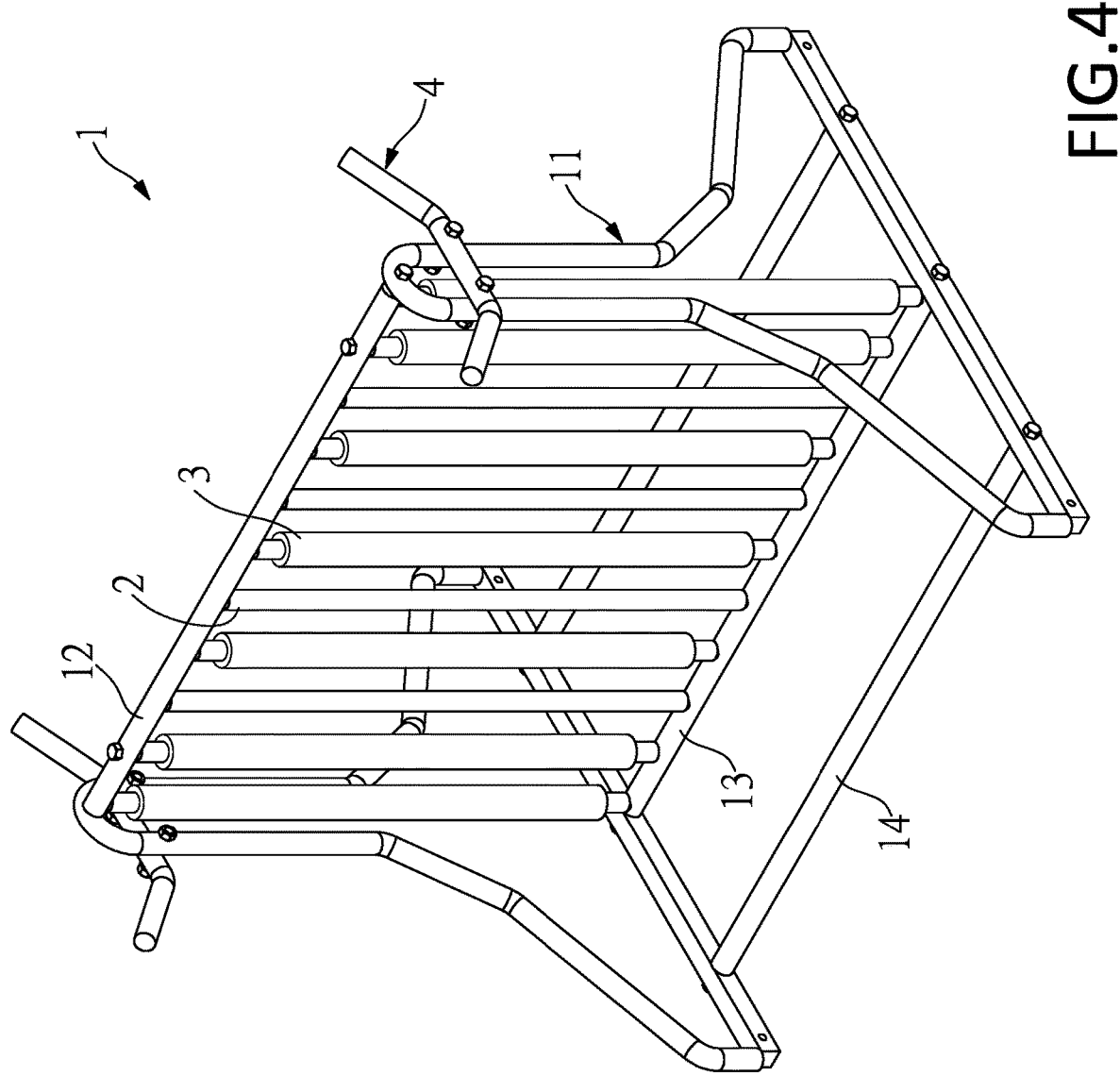
FIG. 4 is a schematic view of a bicycle rack, in which some hose sleeves are removed, according to the present invention.
Figure 5:
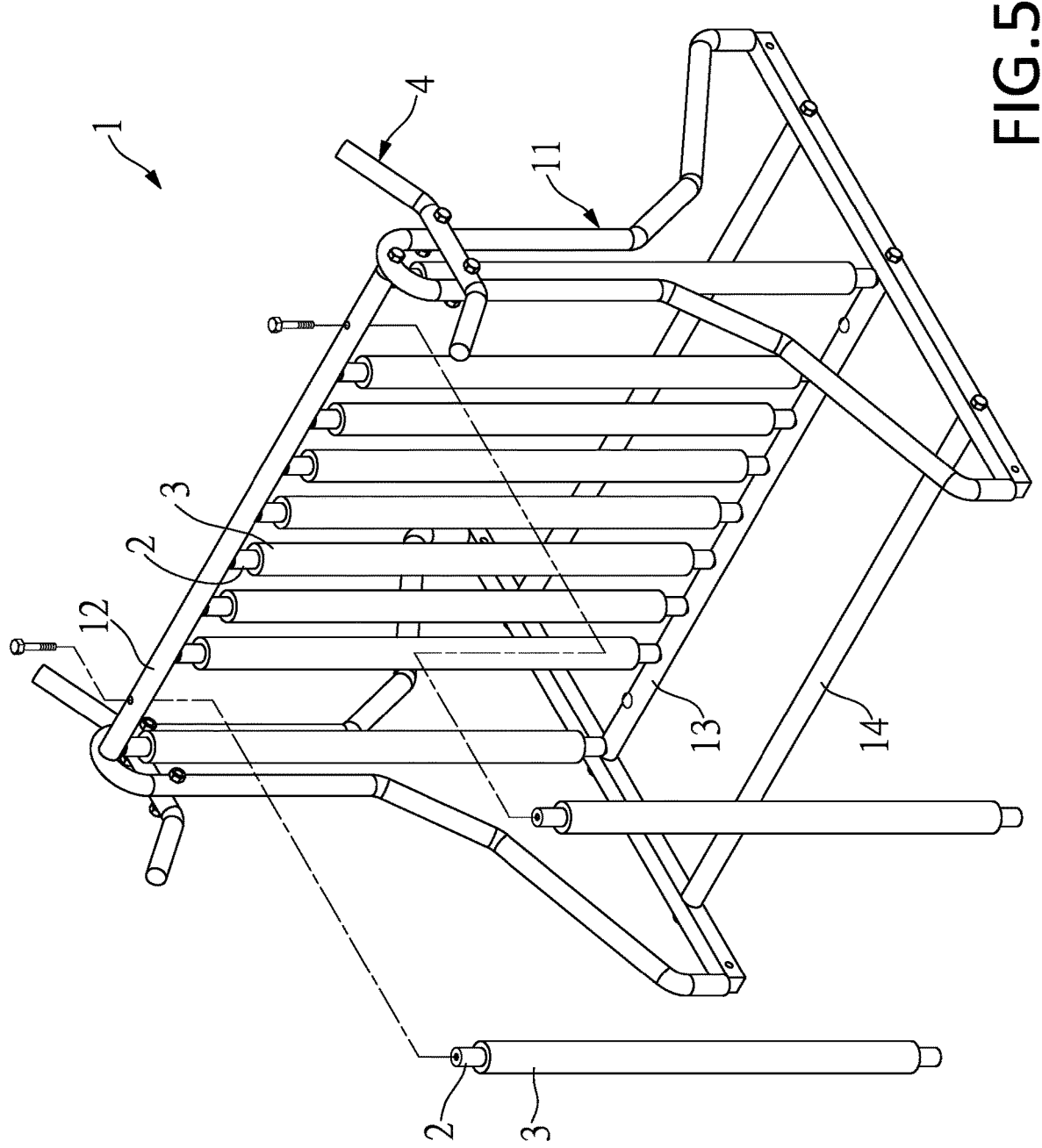
FIG. 5 is a schematic view of an operation of disassembling a compartment bar from a bicycle rack, according to the present invention.

Following the above-mentioned contents, the implementation of the present invention is further described in the following paragraphs. As shown in FIG. 3, two sides of the bicycle rack of the present invention can be used to park bicycles, and the parking operations can be completed by just inserting a front wheel of the bicycle into the interval between the adjacent two compartment bars 2. In an embodiment, the material of the hose sleeve 3 can be EVA material with elasticity, so that even if the wheel width of a bicycle is slightly lower than the interval between the adjacent two compartment bars 2, the bicycle can be tightly packed by the hose sleeves 3 to prevent from swinging. Furthermore, as shown in FIG. 4, the hose sleeve 3 can be disassembled to slightly adjust the interval to meet different wheel width; disassembling the hose sleeve is taken as an example for illustration of this embodiment. In other embodiment, as shown in FIG. 5, the compartment bar 2 can be directly disassembled to greatly adjust the interval to meet different wheel width. Therefore, the bicycle rack of the present invention can indeed solve the problem that the conventional parking rack having fixed interval between two vertical rods is unable to adapt different models of bicycles.

Figure 6:
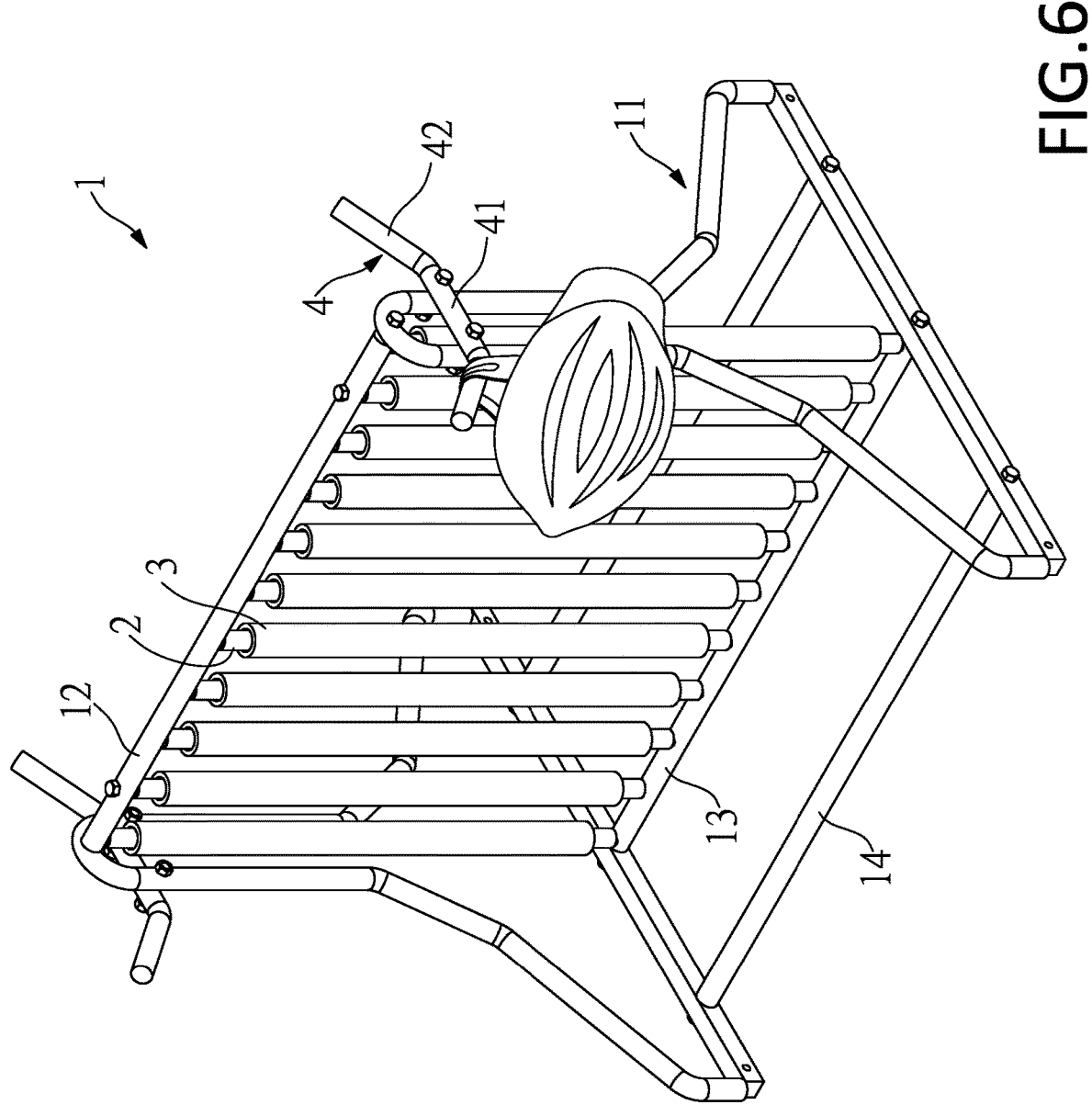
FIG. 6 is a schematic view of a hanging shelf, on which an articles is hung, according to the present invention.

As shown in FIG. 6, the bicycle rack of the present invention can include a hanging shelf 4 for a rider to hang a riding accessory, so as to solve the problem that it is difficult for a rider to hang a riding accessory and the rider have to carry the riding accessory when the bicycles are parked too densely.

According to above-mentioned contents, the present invention indeed solves the problem of conventional parking rack and has novelty and non-obviousness.

Figure 7:
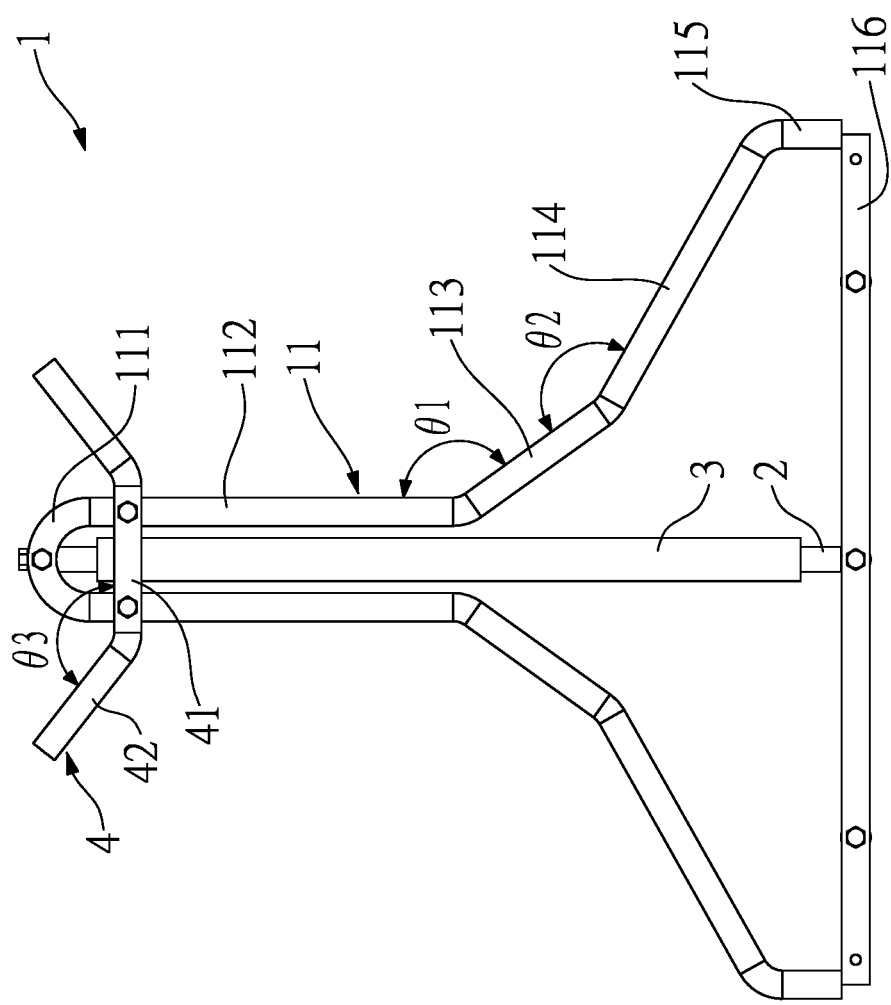
FIG. 7 is a side view of a bicycle rack of the present invention.

As shown in FIG. 7, each of the two side frames 11 includes a curved pan 111 in an inverted-U shape, extension sections 112 respectively extended downward from two ends of the curved part 111, first outer sections 113 respectively bent and extended from the distal ends of the extension sections 112 and away from each other, second outer section 114 respectively bent and extended from the distal ends of the first outer section 113 and away from each other, straight sections 115 respectively bent and extended downwardly from distal ends of the second outer section 114, and a bottom rod 116 connected between distal ends of the straight sections 115. The lower frame bar 13 is connected between the bottom rods 116 of the two side frames 11, the upper frame bar 12 is connected between the curved parts 111 of the two side frames 11. With the above-mentioned structural configuration of the side frame 11 being wide at the top and narrow at the bottom, the bicycle rack of the present invention can be more stable and not easy to fall over when standing on the ground, and the structure with multiple curved sections can greatly increase the overall structural strength.

As shown in FIG. 7, an upper side frame angle θ1 formed between the extension section 112 and the first outer section 113 connected to each other is in a range of 140 degrees to 150 degrees. Preferably, the upper side frame angle θ1 can be 144.33 degrees, and the bending angle can greatly increase the structural strength of the side frame 11 in the extension section 112 and the first outer section 113.

As shown in FIG. 7, included a lower side frame angle θ2 formed between the first outer section 113 and the second outer section 114 connected to each other is in a range of 150 degrees to 160 degrees. Preferably, the lower side frame angle θ2 can be 155.02 degrees, and the bending angle can greatly increase the structural strength of the side frame 11 in the first outer section 113 and the second outer section 114.

As shown in FIG. 7, the hanging shelf 4 can include a crossbar section 41; the crossbar section 41 has inclined rod sections 42 respectively upwardly extended from two ends thereof and away from each other. The above-mentioned configuration of the inclined rod section 42 can prevent the hanging article from easily sliding off the hanging shelf 4.

As shown in FIG. 7, a hanging shelf angle θ3 formed between the crossbar section 41 and the inclined rod section 42 connected to each other is in a range of 140 degrees to 145 degrees. Preferably, the hanging shelf angle θ3 is 142 degrees, so that the hanging article can be prevented from easily sliding off the hanging shelf 4.

As shown in FIG. 1, the bicycle rack of the present invention can include two auxiliary rods 14, and each of the two auxiliary rods 14 is connected between the bottom rods 116 of the side frames 11, the lower frame bar 13 is disposed between the two auxiliary rods 14. The structures of the auxiliary rods 14 can greatly improve the overall stability and structural strength of the bicycle rack of the present invention.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A bicycle rack, comprising:
   a frame body comprising two side frames, an upper frame bar and a lower frame bar, wherein each of the upper frame bar and the lower frame bar is connected between the two side frames;
   a plurality of compartment bars movably disposed between the upper frame bar and the lower frame bar, wherein each adjacent two of the plurality of compartment bars are spaced by an interval;
   a plurality of hose sleeves movably mounted on the plurality of compartment bars, respectively,
   a hanging shelf disposed on one of the two side frames, and
   each of the two side frames comprising a curved part in an inverted-U shape, and extension sections extended downward from two ends of the curved part, first outer sections respectively bent and extended from distal ends of the extension sections and away from each other, second outer sections respectively bent and extended from distal ends of the first outer sections and away from each other, straight sections respectively bent and extended downwardly from distal ends of the second outer sections, and a bottom rod connected to distal ends of the straight section corresponding to the side frame, wherein the lower frame bar is connected between the bottom rods of the two side frame, and the upper frame bar is connected between the curved parts of the two side frame.

2. The bicycle rack according to claim 1, wherein in each of the two side frames, an upper side frame angle is formed between the extension section and the first outer section connected to each other, and the upper side frame angle is in a range of 140 degrees to 150 degrees.

3. The bicycle rack according to claim 1, wherein in each of the two side frames, a lower side frame angle is formed between the first outer section and the second outer section connected to each other, and the lower side frame angle is in a range of 150 degrees to 160 degrees.

4. The bicycle rack according to claim 2, wherein, in each of the two side frames, a lower side frame angle is formed between the first outer section and the second outer section connected to each other, and the lower side frame angle is in a range of 150 degrees to 160 degrees.

5. The bicycle rack according to claim 1, wherein the hanging shelf comprises a crossbar section, and the crossbar section has inclined rod sections respectively upwardly extended from two ends thereof and away from each other.

6. The bicycle rack according to claim 5, wherein, in each of the two side frames, a hanging shelf angle is formed between the crossbar section and the inclined rod section connected to each other, and the hanging shelf angle is in a range of 140 degrees to 145 degrees.

7. The bicycle rack according to claim 1, wherein the hanging shelf comprises a crossbar section, and the crossbar section has inclined rod sections respectively upwardly extended from two ends thereof and away from each other.

8. The bicycle rack according to claim 7, wherein, in each of the two side frames, a hanging shelf angle is formed between the crossbar section and the inclined rod section connected to each other, and the hanging shelf angle is in a range of 140 degrees to 145 degrees.

9. The bicycle rack according to claim 1, further comprises two auxiliary rods, wherein each of the two auxiliary rods is connected between the bottom rods of the two side frame, and the lower frame bar is disposed between the two auxiliary rods.

\* \* \* \* \*